(12) United States Patent
Badger

(10) Patent No.: US 10,201,955 B2
(45) Date of Patent: Feb. 12, 2019

(54) CELLULAR GLASS CORROSION UNDER INSULATION SYSTEM

(71) Applicant: Pittsburgh Corning Corporation, Pittsburgh, PA (US)

(72) Inventor: Steven Robert Badger, Pittsburgh, PA (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 153 days.

(21) Appl. No.: 15/204,276

(22) Filed: Jul. 7, 2016

(65) Prior Publication Data

US 2017/0009914 A1    Jan. 12, 2017

Related U.S. Application Data

(60) Provisional application No. 62/189,442, filed on Jul. 7, 2015.

(51) Int. Cl.
*F16L 59/14* (2006.01)
*B32B 17/06* (2006.01)
(Continued)

(52) U.S. Cl.
CPC .............. *B32B 17/066* (2013.01); *B32B 1/08* (2013.01); *B32B 3/10* (2013.01); *B32B 5/18* (2013.01); *B32B 9/046* (2013.01); *B32B 17/064* (2013.01); *F16L 55/0336* (2013.01); *F16L 58/1054* (2013.01); *F16L 59/143* (2013.01); *B32B 2266/00* (2013.01); *B32B 2266/0214* (2013.01); *B32B 2266/0285* (2013.01);
(Continued)

(58) Field of Classification Search
CPC ....... F16L 59/02; F16L 59/021; F16L 59/024; F16L 59/14
USPC ...... 138/149, 141, 156, 157; 428/36.5, 34.5, 428/36.9, 36.91
See application file for complete search history.

(56) References Cited

U.S. PATENT DOCUMENTS 3,959,541 A    5/1976   King et al.
4,287,245 A *  9/1981   Kikuchi ................ F16L 59/024
                                                         138/141
(Continued)

FOREIGN PATENT DOCUMENTS

CN   203348828        12/2013
DE      3813952 A1    11/1989
(Continued)

OTHER PUBLICATIONS

Foamglas Insulation Systems (Pittsburgh Corning USA) Feb. 2009.
(Continued)

*Primary Examiner* — Patrick F Brinson
(74) *Attorney, Agent, or Firm* — Calfee, Halter & Griswold LLP

(57) ABSTRACT

A cellular glass system for an outer surface of a pipe. An insulation layer surrounds the outer surface of the pipe. The insulation layer has an outer surface and an inner surface and comprises cellular glass. A foam fills an annular space between the outer surface of the pipe and the inner surface of the insulation layer and is configured to limit water intrusion into the annular space and attenuate sound. The system may also include another insulation layer and another foam layer between the two insulation layers.

20 Claims, 4 Drawing Sheets

(51) Int. Cl.
 *B32B 5/18* (2006.01)
 *F16L 58/10* (2006.01)
 *F16L 55/033* (2006.01)
 *B32B 9/04* (2006.01)
 *B32B 1/08* (2006.01)
 *B32B 3/10* (2006.01)

(52) U.S. Cl.
 CPC ....... *B32B 2266/06* (2013.01); *B32B 2266/08* (2013.01); *B32B 2307/102* (2013.01); *B32B 2307/304* (2013.01); *B32B 2307/7265* (2013.01); *B32B 2597/00* (2013.01)

(56) References Cited

U.S. PATENT DOCUMENTS

| | | | |
|---|---|---|---|
| 4,623,585 A | 11/1986 | Linton et al. | |
| 5,569,513 A * | 10/1996 | Fidler | C08J 9/0066 428/304.4 |
| 5,971,034 A * | 10/1999 | Heisey | F16L 9/003 138/141 |
| 6,403,180 B1 | 6/2002 | Barrall | |
| 6,782,922 B1 * | 8/2004 | Migliorini | F16L 59/023 138/149 |
| 2003/0213525 A1 | 11/2003 | Patel et al. | |
| 2005/0022892 A1 * | 2/2005 | Babineau, Jr. | F16L 59/023 138/149 |
| 2010/0154917 A1 | 6/2010 | Batallas et al. | |
| 2010/0193061 A1 * | 8/2010 | Princell | F16L 59/021 138/107 |
| 2012/0018178 A1 | 1/2012 | Stambaugh et al. | |
| 2013/0291984 A1 * | 11/2013 | Himmel | F16L 59/02 138/32 |

FOREIGN PATENT DOCUMENTS

| | | |
|---|---|---|
| EP | 2418080 | 2/2012 |
| GB | 949230 | 2/1964 |

OTHER PUBLICATIONS

Office Action from CN Application No. 201480055058.4 dated Aug. 1, 2018.
Extended European Search Report from EP Application No. 16821962.4 dated Nov. 29, 2018.

* cited by examiner

CELLULAR GLASS CORROSION UNDER INSULATION SYSTEM

CROSS-REFERENCE TO RELATED APPLICATION

This application claims the benefit under 35 U.S.C. § 119(e) of the earlier filing date of U.S. Provisional Patent Application No. 62/189,442 filed on Jul. 7, 2015, the disclosure of which is incorporated by reference herein.

BACKGROUND

This application discloses an invention which is related, generally and in various embodiments, to cellular glass insulation systems.

Cellular glass may be fabricated into sections for various applications such as insulating industrial and commercial pipes as well as insulating vessels. While insulating these applications provides the necessary purpose of energy conservation or process control, other problems may arise. For instance, corrosion under insulation (CUI) may occur under cellular glass insulation where moisture has been allowed to migrate between the cellular glass insulation and the pipes or vessels which are typically comprised of metal. The temperature range for CUI generally occurs between 32° F. and 400° F. This includes liquid water that is trapped under the cellular glass insulation and has not been allowed to evaporate or be removed from the system.

SUMMARY OF THE INVENTION

According to embodiments of the invention, a foam is utilized to fill an annular spacer between the cellular glass insulation and the pipe or vessel being insulated. The foam, when compressed in the annular space, limits the intrusion of moisture under the surface of the cellular glass insulation, thereby eliminating or greatly reducing the risk of CUI. The preferred foam composition utilized will not degrade over the CUI temperature range. In addition, the foam and cellular glass insulation system has several other key attributes including the attenuation of sound. In particular, the foam can be placed either at the annular space of the metal and cellular glass insulation, between an inner and outer layer of the cellular glass insulation, or both at the annular space as well as between the layers of the cellular glass insulation. In addition, the densities of the products can be modified to produce the desired sound attenuation properties.

BRIEF DESCRIPTION OF THE DRAWINGS

For the invention to be clearly understood and readily practiced, the invention will be described in conjunction with the following figures, wherein like reference characters designate the same or similar elements, which figures are incorporated into and constitute a part of the specification, wherein.

DETAILED DESCRIPTION

Figure 1A:
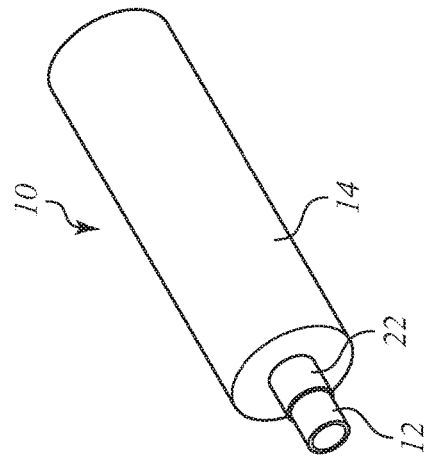
FIG. 1a is a perspective view of a single layer system.
Figure 1B:
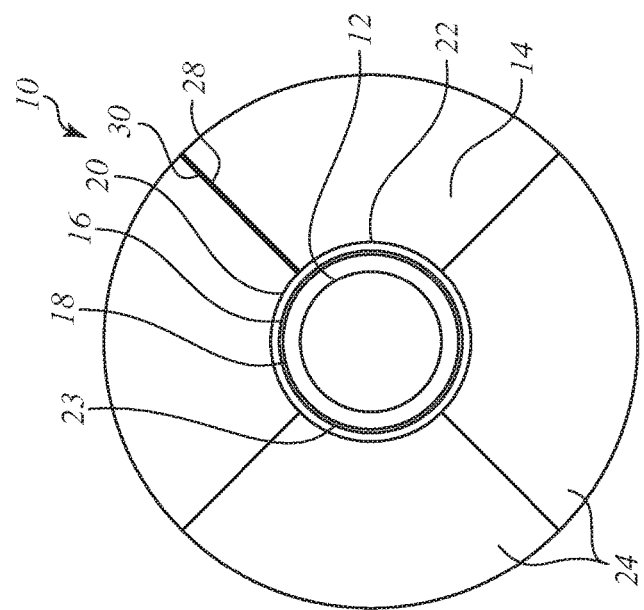
FIG. 1b is an end view of a single layer system having a single cellular glass insulation layer with curved quarter segments.
Figure 1C:
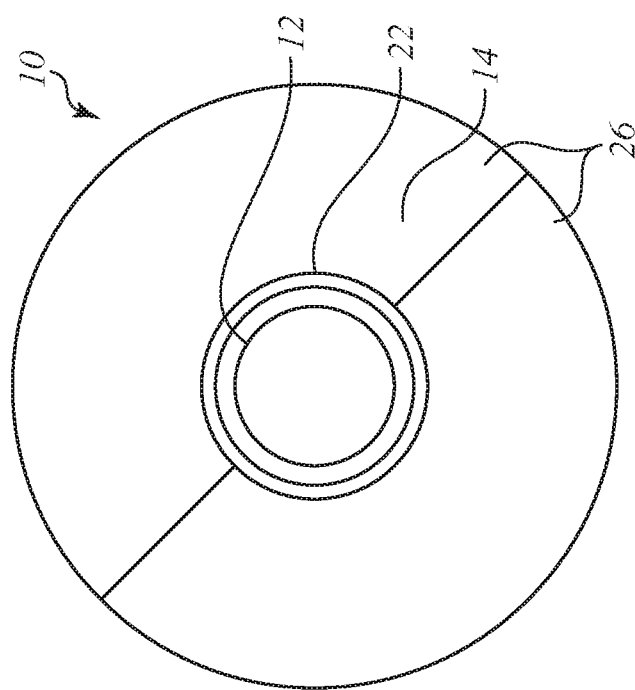
FIG. 1c is an end view of a single layer system having a single cellular glass insulation layer with curved half segments

Referring to FIGS. 1a to 1c, there is illustrated a single layer cellular glass insulation system generally designated by reference numeral 10 for a pipe 12 having a cellular glass insulation layer 14. A pipe and cellular glass insulation annular space or interface 16 is between an outer surface 18 of pipe 12 and an inner surface 20 of cellular glass insulation layer 14. A foam 22 fills the pipe and cellular glass insulation interface 16. Foam 22 limits water intrusion into pipe and cellular glass insulation interface 16 and attenuates sound. The preferred foam material does not degrade over the application temperature range. Example foam materials include silicone sponges, silicone foams, polyimide foams, nitrile foams, and melamine foams. A primary consideration when choosing the foam is the compressibility of the foam. The foam material should have a compression force of less than 2 psi at 25% compression utilizing ASTM D 1056 test procedure. Ideally, the foam material will have a 25% compression force rating per this test at less than 1 psi. This property is significant in that it defines the compressibility of the foam between the rigid metal of the pipe and cellular glass insulation layer. A foam material that is difficult to compress will not perform as desired. The foam 22 may be open or closed celled. If the foam is open-celled, it must compress to a level that significantly limits moisture migration under the cellular glass insulation layer or it must include another CUI mitigating property such as a hydrophobe, corrosion inhibitor, or water resistant coating/finish. The foam 22 may contain a water resistant layer 23 (FIG. 1b) such as aluminum foil, stainless steel foil, or other spray applied product. An example of the spray applied product is a urethane or silicone coating. In addition, the foam may contain a hydrophobe to limit moisture migration through the foam and/or a corrosion inhibitor. The corrosion inhibitor will be either impregnated into the foam or sprayed on the surface in contact with metal.

Foam 22 may also be placed to attenuate sound The sound attenuation properties must be tested for the chosen foam material but testing has shown that a foam placed between the rigid cellular glass insulation layer and the metal of the pipe will lower and attenuate sound levels. Utilizing multiple layers of foams with the cellular glass insulation layer will give improved performance. In addition, the utilization of a higher density cellular glass insulation layer (8-15 pcf) with the foam will provide improved performance for low frequency sounds. The cellular glass insulation layer 14 and foam 22 may either be applied in the field or applied prior to installation at the project site.

First cellular glass insulation layer 14 may either be curved segments, such as quarter segments 24 as shown FIG. 1b or two half clam shells, such as half segments 26 as shown in FIG. 1c. Joints 28 between edges of the segments 24, 26 may be sealed with a sealant 30 such as silicone.

Figure 2A:
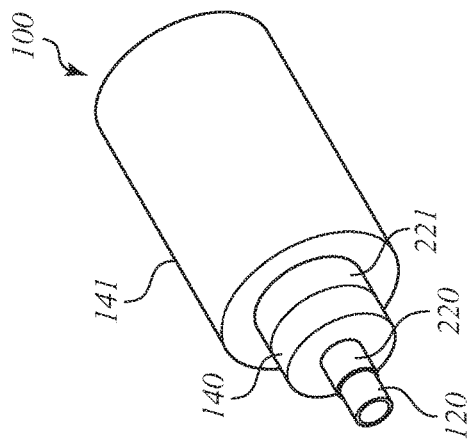
FIG. 2a is a perspective view of a double layer system.
Figure 2B:
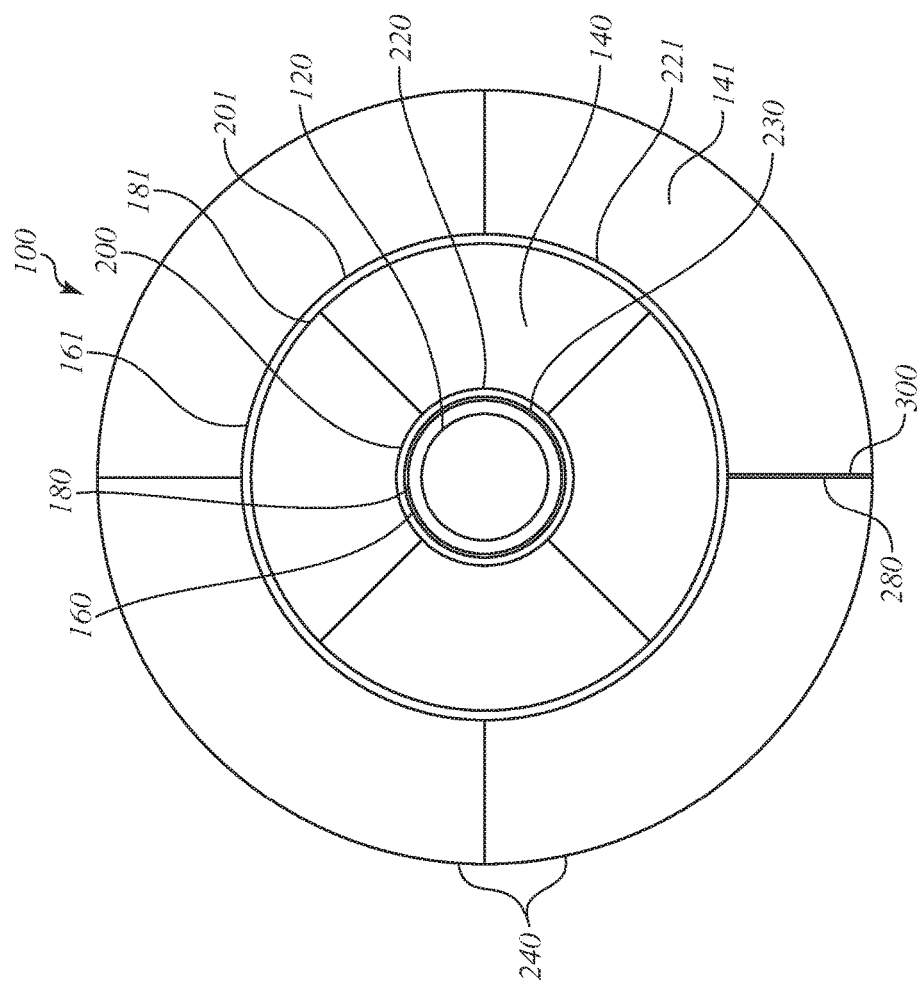
FIG. 2b is an end view of a double layer system having two cellular glass insulation layers with curved quarter segments.
Figure 2C:
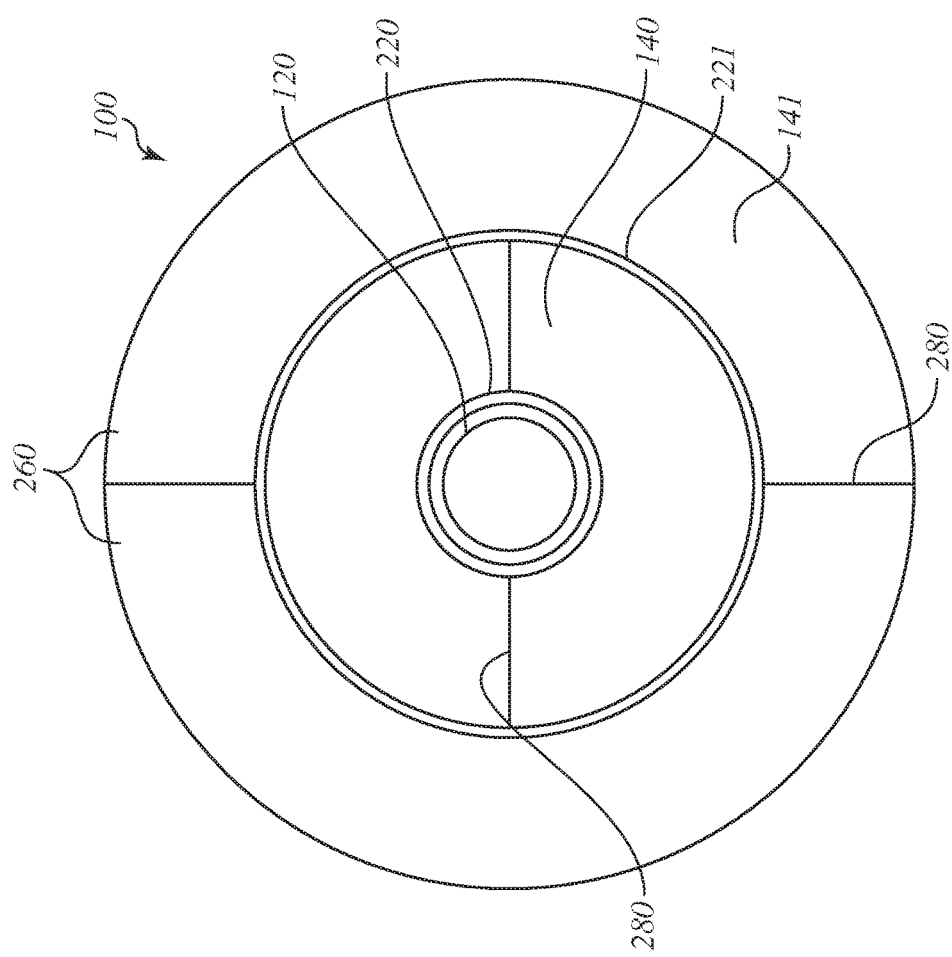
FIG. 2c is an end view of a double layer system having two cellular glass insulation layers with curved half segments.

Referring to FIGS. 2a to 2c, there is illustrated a double layer cellular glass insulation system generally designated by reference numeral 100 for a pipe 120 having a first cellular glass insulation layer 140 and a second cellular glass insulation layer 141. A pipe and cellular glass insulation interface 160 is between an outer surface 180 of pipe 120 and an inner surface 200 of first cellular glass insulation layer 140. A first foam 220 fills pipe and cellular glass insulation interface 160. A cellular glass insulation layer interface 161 is between an outer surface 181 of first cellular glass insulation layer 140 and an inner surface 201 of second cellular glass insulation layer 141. A second foam 221 fills cellular glass insulation layer interface 161. Like the embodiment of FIGS. 1b and 1c, cellular glass insulation layers 140 and 141 may either either have curved segments, such as quarter segments 240 as shown FIG. 2b or two half clam shells, such as half segments 260 as shown in FIG. 2c. Joints 280 are rotated such that the joints 280 on the cellular glass insulation layers 140 and 141 are not in the same radial position, but are offset to one another. Like the embodiment of FIGS. 1b and 1c, the embodiments of FIGS. 2a and 2b may include sealant 300 in joint 280 and a water resistant layer 230 on foam 220.

Although the present invention has been described in detail for the purpose of illustration, it is to be understood that such detail is solely for that purpose and that variations can be made therein by those in the art without departing from the spirit and scope of the invention.

What is claimed is:

1. A cellular glass corrosion under insulation system for an outer surface of a pipe comprising:
    a first insulation layer surrounding the outer surface of the pipe, wherein the first insulation layer has an outer surface and an inner surface, wherein the first insulation layer comprises cellular glass;
    a first annular space between the outer surface of the pipe and the inner surface of the first insulation layer; and
    a first foam filling the first annular space configured to limit water intrusion into the annular space and attenuate sound.

2. The cellular glass corrosion under insulation system of claim 1, further comprising:
    a second insulation layer surrounding the outer surface of the first insulation layer, wherein the second insulation layer has an outer surface and an inner surface, wherein the second insulation layer comprises cellular glass;
    a second annular space between the outer surface of the first insulation layer and the inner surface of the second insulation layer;
    a second foam filling the second annular space configured to limit water intrusion into the annular space and attenuate sound.

3. The cellular glass corrosion under insulation system of claim 1, wherein the first insulation layer comprises curved segments.

4. The cellular glass corrosion under insulation system of claim 3, wherein the curved segments are quarter segments.

5. The cellular glass corrosion under insulation system of claim 3, wherein the curved segments are half segments.

6. The cellular glass corrosion under insulation system of claim 3, further comprising joints between the curved segments, wherein the joints are closed with a sealant.

7. The cellular glass corrosion under insulation system of claim 2, wherein the first and second insulation layers comprise curved segments.

8. The cellular glass corrosion under insulation system of claim 7, wherein the curved segments are quarter segments.

9. The cellular glass corrosion under insulation system of claim 7, wherein the curved segments are half segments.

10. The cellular glass corrosion under insulation system of claim 2, wherein at least one of the first foam and the second foam is comprised of a material having a compression force of less than 2 psi at 25% compression.

11. The cellular glass corrosion under insulation system of claim 1, wherein the foam is closed cell.

12. The cellular glass corrosion under insulation system of claim 1, wherein the foam is open cell.

13. The cellular glass corrosion under insulation system of claim 1, further comprising a water resistant layer on the first foam.

14. The cellular glass corrosion under insulation system of claim 1, wherein the foam comprises a material selected from silicone sponges, silicone foams, polyimide foams, nitrile foams, and melamine foams.

15. A cellular glass corrosion under insulation system for an outer surface of a pipe comprising:
    a first insulation layer surrounding the outer surface of the pipe, wherein the first insulation layer has an outer surface and an inner surface, wherein the first insulation layer comprises cellular glass;
    a first annular space between the outer surface of the pipe and the inner surface of the first insulation layer;
    a first foam filling the first annular space configured to limit water intrusion into the annular space and attenuate sound;
    a second insulation layer surrounding the outer surface of the first insulation layer, wherein the second insulation layer has an outer surface and an inner surface, wherein the second insulation layer comprises cellular glass;
    a second annular space between the outer surface of the first insulation layer and the inner surface of the second insulation layer; and
    a second foam filling the second annular space configured to limit water intrusion into the annular space and attenuate sound.

16. The cellular glass corrosion under insulation system of claim 15, wherein the first insulation layer and the second insulation layer comprise curved segments.

17. The cellular glass corrosion under insulation system of claim 15, wherein the foam is closed cell.

18. The cellular glass corrosion under insulation system of claim 15, wherein the foam is open cell.

19. The cellular glass corrosion under insulation system of claim 15, further comprising a water resistant layer on at least one foam.

20. A cellular glass corrosion under insulation system for an outer surface of a pipe comprising:
    a first insulation layer surrounding the outer surface of the pipe, wherein the first insulation layer has an outer surface and an inner surface, wherein the first insulation layer comprises cellular glass;
    a first annular space between the outer surface of the pipe and the inner surface of the first insulation layer; and
    a first foam filling the first annular space configured to limit water intrusion into the annular space and attenuate sound; and
    a water resistant layer on the first foam.

* * * * *